United States Patent
Lu et al.

(10) Patent No.: US 9,787,393 B2
(45) Date of Patent: Oct. 10, 2017

(54) METHOD FOR REALIZING BLUETOOTH-BINDING BETWEEN SMART KEY DEVICE AND MOBILE DEVICE

(71) Applicant: FEITIAN TECHNOLOGIES CO., LTD, Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 9 days.

(21) Appl. No.: 15/164,757

(22) Filed: May 25, 2016

(65) Prior Publication Data
US 2016/0269103 A1 Sep. 15, 2016

Related U.S. Application Data

(63) Continuation of application No. PCT/CN2015/089752, filed on Sep. 16, 2015.

(30) Foreign Application Priority Data

Dec. 12, 2014 (CN) .......................... 2014 1 0771671

(51) Int. Cl.
*H04B 7/00* (2006.01)
*H04B 7/26* (2006.01)
(Continued)

(52) U.S. Cl.
CPC .............. *H04B 7/26* (2013.01); *G06F 21/43* (2013.01); *G06F 21/445* (2013.01);
(Continued)

(58) Field of Classification Search
CPC ... H04B 7/26; H04L 61/6022; H04L 63/0876; G06F 21/43; G06F 21/445; H04W 12/04;
(Continued)

(56) References Cited

U.S. PATENT DOCUMENTS

| 9,305,412 B2* | 4/2016 | Winkelman ....... G07C 9/00309 |
| 9,305,565 B2* | 4/2016 | Levien .................... G10L 21/00 |
| 2006/0047957 A1 | 3/2006 | Helms et al. ................. 713/165 |

FOREIGN PATENT DOCUMENTS

| CN | 102469453 A | 5/2012 |
| CN | 102983892 A | 3/2013 |

(Continued)

OTHER PUBLICATIONS

Chinese International Search Report (Form PCT/ISA/210), Notification of Transmittal of the International Search Report and the Written Opinion of the International Searching Authority, or the Declaration (Form PCT/ISA/220), and Written Opinion of the International Searching Authority (Form/ISA/237) of corresponding International PCT Application No. PCT/CN2015/089752, dated Dec. 18, 2015.

*Primary Examiner* — Eugene Yun
(74) *Attorney, Agent, or Firm* — J.C. Patents (57) ABSTRACT

The present invention discloses a method for realizing bluetooth-binding between a smart key device and a mobile device, which belongs to the field of information security. The method comprises: the smart key device performs bluetooth pairing with a current paired mobile device, obtains and determines a bind identification when the pairing succeeds; in case that the bind identification is bind, it determines whether a mac address of the current mobile device is the same as a stored mac address of the bound mobile device, and, if yes, executes a data interactive operation, otherwise, reports an error; in case that the bind identification is unbind, it takes the mac address of the current paired mobile device as the mac address of the bound mobile device and the address, and sets the bind identification as bind, and executes the data interactive operation.

20 Claims, 5 Drawing Sheets

(51) Int. Cl.
| | |
|---|---|
| H04W 4/00 | (2009.01) |
| H04W 12/04 | (2009.01) |
| H04W 12/06 | (2009.01) |
| H04W 52/02 | (2009.01) |
| H04W 76/00 | (2009.01) |
| G06F 21/43 | (2013.01) |
| G06F 21/44 | (2013.01) |
| H04L 29/06 | (2006.01) |
| H04L 29/12 | (2006.01) |
| H04W 88/02 | (2009.01) |
| H04W 8/00 | (2009.01) |
| H04W 84/20 | (2009.01) |

(52) U.S. Cl.
CPC ........... *H04L 63/0876* (2013.01); *H04W 4/00* (2013.01); *H04W 4/008* (2013.01); *H04W 12/04* (2013.01); *H04W 12/06* (2013.01); *H04W 52/0209* (2013.01); *H04W 76/00* (2013.01); *G06F 2221/2105* (2013.01); *G06F 2221/2107* (2013.01); *H04L 61/6022* (2013.01); *H04W 8/005* (2013.01); *H04W 84/20* (2013.01); *H04W 88/02* (2013.01); *Y02B 60/50* (2013.01)

(58) Field of Classification Search
CPC ....... H04W 12/06; H04W 4/00; H04W 4/008; H04W 52/0209; H04W 76/00
USPC ........................................................ 455/41.2
See application file for complete search history.

(56) References Cited

FOREIGN PATENT DOCUMENTS

| | | |
|---|---|---|
| CN | 104182676 A | 12/2014 |
| CN | 104507037 A | 4/2015 |

* cited by examiner

METHOD FOR REALIZING BLUETOOTH-BINDING BETWEEN SMART KEY DEVICE AND MOBILE DEVICE

CROSS-REFERENCE TO RELATED APPLICATIONS

This application is a continuation of International Application No. PCT/CN2015/089752, filed on Sep. 16, 2015, which claims priority to Chinese Patent Application No. 201410771671.8, filed on Dec. 12, 2014, both of which are hereby incorporated by reference in their entireties.

FIELD OF THE INVENTION

The present invention relates to the field of information security, more particular, to a method for realizing bluetooth-binding between a smart key device and a mobile device.

BACKGROUND OF THE INVENTION

A bluetooth smart key device is a smart key device with a bluetooth, which uses two-factor authentication, and it is more convenient and costs less for a user. A single chip microcontroller or a smart key device chip is installed in a smart key device for storing a smart key or a digital certificate of a user, thus, it can authenticate the user's ID by using a cipher algorithm in the smart key device; the smart key device has multiple functions, such as encrypting an E-mail, digital signature, security certificate, logging in a security network and access to an SSL security network. Besides, the smart key device is very secure because it has a characteristic of ensuring that a private key of the user is always with hardware and a characteristic of anti-attack physically.

In prior art, each time the smart key device is started, it can be searched by other mobile devices, and it is connected to the mobile devices passively, which is not safe because the smart key device cannot prevent a malicious mobile device from using the device for trade.

SUMMARY OF THE INVENTION

The present invention provides a method for realizing bluetooth-binding between a smart key device and a mobile device, including:

Step S1, powering on a smart key device and initializing the smart key device;

Step S2, performing, by the smart key device, bluetooth pairing with a current paired mobile device, and determining whether the pairing is finished in a preset duration, if yes, executing Step S3; otherwise, starting a power-saving mode;

Step S3, obtaining, by the smart key device, a binding state of the smart key device, and determining the binding state; executing Step S4 in case that the binding state is bind; executing Step S6 in case that the binding state is unbind;

Step S4, obtaining, by the smart key device, a mac address of the current paired mobile device from a bluetooth module storage area of the smart key device, and obtaining a mac address of a bound mobile device from a device storage area of the smart key device;

Step S5, determining, by the smart key device, whether the mac address of the bound mobile device is same as the mac address of the current paired mobile device, if yes, executing Step S7; otherwise, reporting an error and starting the power-saving mode;

Step S6, taking, by the smart key device, the mac address of the current paired mobile device in the bluetooth module storage area as the mac address of the bound mobile device, and storing the mac address into the device storage area, and setting the binding state as bind, and executing Step S7;

Step S7, performing, by the smart key device, a data interactive operation between the smart key device and the current paired mobile device.

Furthermore, Step S2 specifically includes:

Step S2-1, turning on, by the smart key device, an overtime-pairing timer interrupt;

Step S2-2, checking, by the smart key device, whether a timer-overtime identification is set, if yes, starting the power-saving mode; otherwise, executing Step S2-3;

Step S2-3, determining, by the smart key device, whether the bluetooth pairing is finished, if yes, executing Step S3; otherwise, starting the power-saving mode;

the method further includes: starting, by the smart key device, an overtime-paring timer, triggering the overtime-pairing timer interrupt when a value of the overtime-pairing timer reaches a preset duration, setting the timer-overtime identification, and exiting from the overtime-pairing timer interrupt.

Furthermore, Step S3 specifically includes: obtaining, by the smart key device, a device bluetooth-bind identification from the device storage area of the smart key device, and determining whether the device bluetooth-bind identification is set, if yes, the binding state is bind, and executing Step S4; otherwise, the binding state is unbind, and executing Step S6;

in Step S6, the setting the binding state as bind specifically includes: setting the device bluetooth-bind identification.

Furthermore, before Step S4, the method further includes: determining whether the mac address of the current paired mobile device can be obtained from the bluetooth module storage area, and determining whether the mac address of the bound mobile device can be obtained from the device storage area, if yes, executing Step S4; otherwise, reporting an error and entering the power-saving mode;

before Step S6, the method further includes: determining whether the mac address of the current paired mobile device can be obtained from the bluetooth module storage area, if yes, executing Step S6; otherwise, reporting an error, and starting the power-saving mode.

Furthermore, in Step S2, the smart key device performing the bluetooth pairing with the current paired mobile device specifically includes:

Step 1, waiting, by the smart key device, for receiving a bluetooth-pairing request sent by the current paired mobile device;

Step 2, obtaining, by the smart key device, the mac address of the smart key device stored in the bluetooth module storage area after the bluetooth-pairing request is received by the smart key device, and sending the mac address of the smart key device to the current paired mobile device;

Step 3, storing, by the current paired mobile device, the mac address of the smart key device, and sending the mac address of the current paired mobile device to the smart key device;

Step 4, storing, by the smart key device, the mac address of the current paired mobile device into the bluetooth module storage area, and the pairing being finished.

Furthermore, Step 3 specifically includes: storing, by the current paired mobile device, the mac address of the smart key device, receiving a pairing password entered by a user, and sending a verifying-pairing-password instruction which includes the pairing password and the mac address of the current paired mobile device to the smart key device;

between Step 3 and Step 4, the method further includes: obtaining, by the smart key device, the pairing password from the pairing-password instruction after receiving the verifying-pairing-password instruction, and determining whether the pairing password matches a pairing password stored inside the device, if yes, executing Step 4; otherwise, reporting an error, and ending.

Furthermore, between Step S1 and Step S2, the method further includes:

Step a1, determining, by the smart key device, whether key-triggered information is received, if yes, executing Step a2; otherwise, executing Step S2;

Step a2, determining, by the smart key device, the binding state; executing Step a3 in case that the binding state is bind; executing Step a4 in case that the binding state is unbind;

Step a3, deleting the mac address of the bound mobile device stored in the device storage area, and setting the binding state as unbind, and executing Step S2;

Step a4, obtaining the mac address of the current paired mobile device from the bluetooth module storage area, taking the mac address as the mac address of the bound mobile device, and storing the address into the device storage area, and setting the binding state as bind, and executing Step S2.

Furthermore, before Step a3, the method further includes: prompting, by the smart key device, information whether unbinding is needed, and checking a key operation; executing Step a3 in case that an OK key is pressed; canceling prompting information of unbinding and executing Step S2 in case that a Cancel key is pressed.

Furthermore, before Step a4, the method further includes: prompting, by the smart key device, information whether binding is needed, and checking the key operation; executing Step a4 in case that the OK key is pressed; canceling prompting information of binding and executing Step S2 in case that the Cancel key is pressed.

Furthermore, before Step a4, the method further includes: determining, by the smart key device, whether the mac address of the current paired mobile device can be obtained from the bluetooth module storage area, if yes, executing Step a4, otherwise, returning information that binding cannot be performed, and executing Step S2.

Furthermore, between Step S1 and Step S2, the method further includes:

Step b1, determining, by the smart key device, whether audio data is received; if yes, executing Step b2; otherwise, executing Step S2;

Step b2, determining, by the smart key device, a type of operation according to the audio data; executing Step b3 in case that the operation is binding; executing Step b4 in case that the operation is unbinding;

Step b3, taking, by the smart key device, a mac address of a mobile device in the audio data as the mac address of the bound mobile device and storing the address into the device storage area, and setting the binding state as bind, and executing Step S2;

Step b4, deleting, by the smart key device, the mac address of the bound mobile device in the device storage area, and setting the binding state as unbind, and executing Step S2.

Furthermore, Step S1 further includes: initializing audio communication;

before Step S2, the method further includes: turning down, by the smart key device, the audio communication, and executing Step S2.

Furthermore, before Step b3, the method further includes:

Step c1, obtaining the binding state from the device storage area, and determining whether the binding state is bind; if yes, executing Step c2; otherwise, executing Step b3;

Step c2, obtaining the mac address of the bound mobile device from the device storage area, determining whether the mac address of the mobile device in the audio data is same as the mac address of the bound mobile device in the device storage area; if yes, executing Step b5; otherwise, executing Step b3.

Furthermore, before Step b4, the method further includes:

Step d1, obtaining the binding state from the device storage area, and determining whether the binding state is bind; if yes, executing Step b4; otherwise, executing Step d2;

Step d2, obtaining the mac address of the bound mobile device from the device storage area, and determining whether the mac address of the mobile device in the audio data is same as the mac address of the bound mobile device in the device storage area; if yes, executing Step b5; otherwise, executing Step b4.

Furthermore, before Step b1, the method further includes:

Step e1, waiting, by the mobile device, for receiving a choice from a user; executing Step e2 in case that the choice from the user is bluetooth binding; executing Step e3 in case that the choice from the user is bluetooth unbinding;

Step e2, obtaining, by the mobile device, the mac address of the mobile device, generating, according to the mac address of the mobile device, audio data indicating that binding is needed, and sending the audio data to the smart key device, and executing Step b1;

Step e3, generating, by the mobile device, audio data indicating that unbinding is needed, and sending the audio data to the smart key device, and executing Step b1.

Furthermore, in Step e2, generating, according to the mac address of the mobile device, the audio data indicating that binding is needed specifically includes: setting, by the mobile device, a bluetooth-bind identification of the mobile device, and generating the audio data according to the mac address of the mobile device and the set bluetooth-bind identification of the mobile device;

in Step e3, generating the audio data indicating that unbinding is needed specifically includes: resetting, by the mobile device, the bluetooth-bind identification of the mobile device, and generating the audio data according to the reset bluetooth-bind identification of the mobile device;

in Step b2, determining the type of the operation according to the audio data specifically includes: obtaining the bluetooth-bind identification of the mobile device from the audio data, and determining the bluetooth-bind identification of the mobile device; in case that the bluetooth-bind identification is set, a binding operation being indicated, executing Step b3; in case that the bluetooth-bind identification is reset, an unbinding operation being indicated, executing Step b5.

Furthermore, before Step e1, the method further includes:

Step f1, obtaining, by the mobile device, handshake data stored inside the device, generating a handshake instruction according to the handshake data, and sending the handshake instruction to the smart key device;

Step f2, parsing, by the smart key device, the received handshake instruction to obtain the handshake data, determining whether the handshake data in the handshake instruction matches handshake data stored inside the device; if yes, executing Step f3; otherwise, executing Step S2;

Step f3, generating, by the smart key device, a handshake response according to the handshake data stored inside the device, and returning the handshake response to the mobile device;

Step f4, parsing, by the mobile device, the received handshake response to obtain the handshake data, determining whether the handshake data in the handshake response matches the handshake data stored inside the device; if yes, executing Step e1; otherwise, executing Step S2.

Furthermore, Step S7 specifically includes:

Step g1, waiting, by the smart key device, for receiving an instruction sent by the current paired mobile device, and determining whether the instruction is received; if yes, processing the received instruction, and returning to Step g1 after the processing is finished; otherwise, executing Step g2;

Step g2, checking, by the smart key device, a key operation, and determining whether a key trigger is received in a preset duration; if yes, executing Step g3; otherwise, starting the power-saving mode;

Step g3, determining, by the smart key device, whether received trigger information is trigger information of long pressing an OK key; if yes, executing Step g4; otherwise, returning to Step g1;

Step g4, obtaining, by the smart key device, the binding state from the device storage area and checking the binding state; executing Step g5 in case that the binding state is bind; executing Step g6 in case that the binding state is unbind;

Step g5, setting, by the smart key device, the binding state as unbind, deleting the mac address of the bound mobile device stored in the device storage area, and returning to Step g1;

Step g6, setting, by the smart key device, the binding state as bind, storing the mac address of the current paired mobile device into the device storage area, and returning to Step g1.

Furthermore, before Step g5, the method further includes: prompting, by the smart key device, information whether unbinding is needed, and checking a key operation; executing Step g5 in case that the OK key is pressed; canceling prompting information of unbinding and returning to Step g1 in case that the Cancel key is pressed.

Furthermore, before Step g6, the method further includes: prompting, by the smart key device, information whether binding is needed, and checking the key operation; executing Step g6 in case that the OK key is pressed; canceling prompting information of binding and executing Step g1 in case that the Cancel key is pressed.

The present invention provides a method for realizing bluetooth-binding between a smart key device and a mobile device, which can realize bluetooth-binding of the smart key device through setting by a user; the method makes the interaction of bluetooth data more secure because the smart key device just only connects to a bound mobile device after being powered on.

DETAILED DESCRIPTION OF EMBODIMENTS

The technical solution in embodiments of the present invention is further described more clearly and completely with the drawings in the embodiments of the present invention. Apparently, embodiments described herein are just a few embodiments of the present invention. On the basis of the embodiments of the invention, all other related embodiments made by those skilled in the art without any inventive work belong to the scope of the invention.

In the present invention, a smart key device includes a microprocessor module and a bluetooth module, in which, the microprocessor module includes a device storage area (which is a flash inside the smart key device and stores a device bluetooth-bind identification); the bluetooth module is configured to store a mac address of a mobile device currently paired with the bluetooth smart key device.

Embodiment 1 of the present invention provides a scheme that the smart key device performs bluetooth binding automatically after the device is powered on; Embodiment 2 of the present invention provides a scheme that bluetooth-binding is performed by being triggered (key-triggered or instruction-triggered); Embodiment 3 of the present invention provides a scheme that the smart key device receives binding information sent by a mobile device via audio communication.

Embodiment 1

Figure 1:
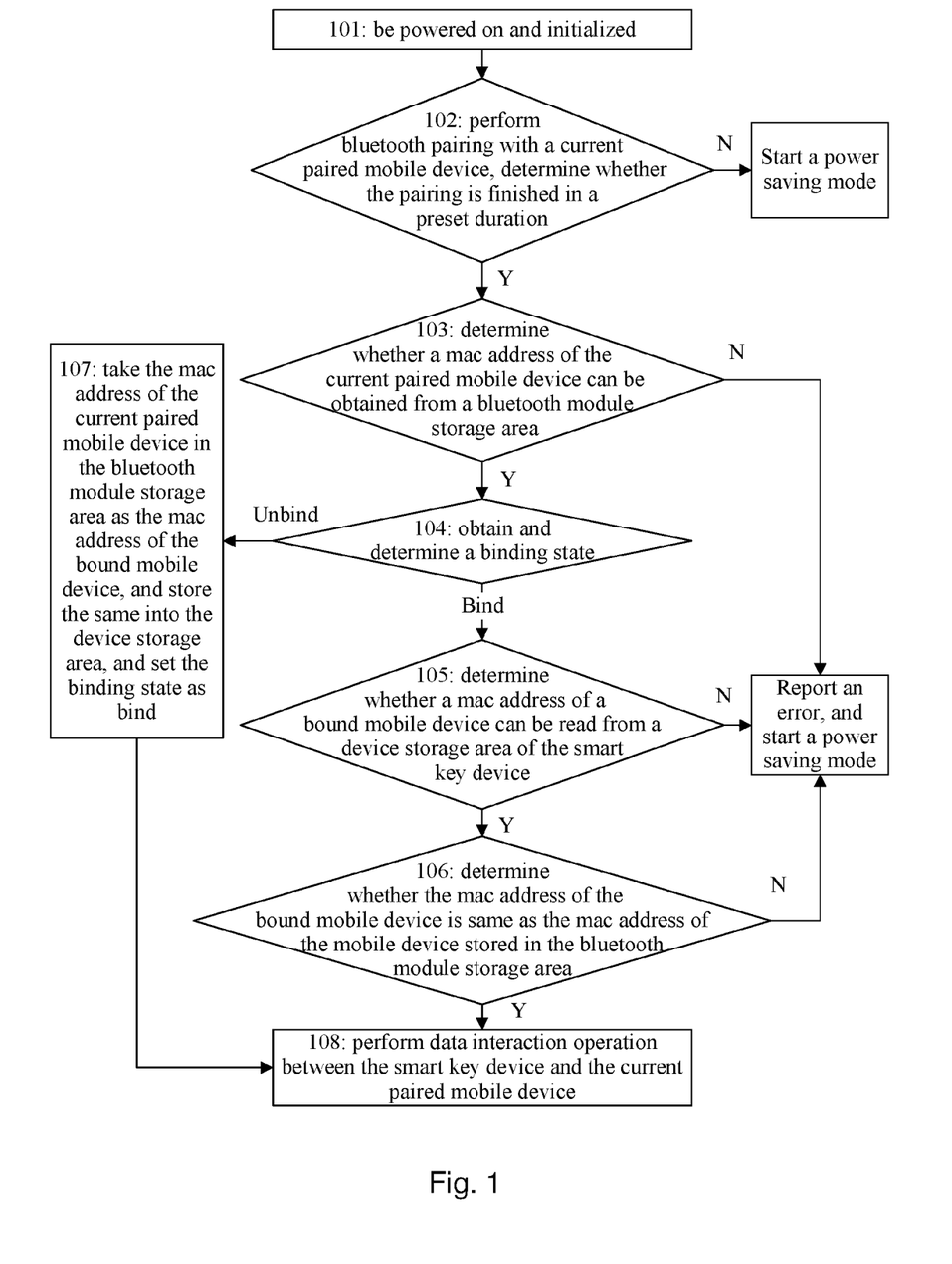
FIG. 1 illustrates a flow chart of a method for realizing bluetooth-binding between a smart key device and a mobile device according to Embodiment 1 of the present invention.

Embodiment 1 of the present invention provides a method for realizing bluetooth-binding between a smart key device and a mobile device, and this embodiment applies to all of the smart key devices with a bluetooth communication function, as shown in FIG. 1, the smart key device executes following steps:

Step 101, be powered on and initialized.

In this embodiment, a device bluetooth-bind identification is a resetting state when the smart key device is delivered, and the device bluetooth-bind identification is not operated when the smart key device is powered on and initialized.

Powering on includes: long pressing on an OK key to turn on the device or triggering to waken a bluetooth connection from a sleep state.

Step 102, perform bluetooth-pairing with a current paired mobile device, and determine whether the pairing is finished in a preset duration, if yes, execute Step 103; otherwise, start a power-saving mode.

In this embodiment, the power-saving mode may be that the smart key device is turned down or enters a sleep mode, in which, the sleep mode includes turning down a display screen, etc.

In this embodiment, the determining whether the pairing is finished in a preset duration specifically includes:

Step 102-1, turn on an overtime-pairing timer interrupt.

Step 102-2, check whether a timer-overtime identification is set; if yes, start the power-saving mode; otherwise, the bluetooth-pairing is finished.

The embodiment further includes: turn on an overtime-pairing timer, trigger an overtime-pairing timer interrupt when the value of the overtime-match timer reaches a preset duration, and then set the timer-overtime identification and exit from the overtime-pairing timer interrupt; preferably, the preset duration is 2 min.

This step specifically includes:

Step 1, the smart key device waits for a bluetooth-pairing request sent by the mobile device.

Step 2, after receiving the bluetooth-pairing request sent by the mobile device, the smart key device obtains a mac address of the smart key device which is stored in a bluetooth module storage area of the smart key device, and sends the mac address of the smart key device to the mobile device.

Step 3, the mobile device stores the mac address of the smart key device.

Step 4, the mobile device receives a pairing password entered by a user, and sends a verifying-pairing-password instruction which includes a mac address of the mobile device and the pairing password to the smart key device.

Step 5, after receiving the verifying-pairing-password instruction, the smart key device determines whether the pairing password is correct; if yes, Step 6 is executed; otherwise, information that the password is wrong is returned, and the process ends.

Step 6, the smart key device stores the mac address of the mobile device in the verifying-pairing-password instruction into the bluetooth module storage area, and the pairing is finished.

Step 103, determine whether a mac address of the current paired mobile device can be obtained from the bluetooth module storage area; if yes, execute Step 104; otherwise, report an error, and start the power-saving mode.

Step 104, obtain and determine a binding state; execute Step 105 in case that the binding state is bind; execute Step 107 in case that the binding state is unbind.

This step specifically includes: obtain a device bluetooth-bind identification from a device storage area of the smart key device, and determine whether the device bluetooth-bind identification is set; if yes, the binding state is bind, and execute Step 105; otherwise, the binding state is unbind, and execute Step 107.

In the embodiment, it is agreed in advance that when the device bluetooth-bind identification is set, it is indicated that the smart key device has been bound to the mobile device, and when the device bluetooth-bind identification is reset, it is indicated that the smart key device has not been bound to the mobile device.

Step 105, determine whether the mac address of the bound mobile device can be read from the device storage area of the smart key device; if yes, execute Step 106; otherwise, report an error and start the power-saving mode.

Step 106, determine whether the mac address of the bound mobile device is the same as the mac address of the mobile device in the bluetooth module storage area; if yes, execute Step 108; otherwise, report an error and start the power-saving mode.

Step 107, take the mac address of the current paired mobile device stored in the bluetooth module storage area as the mac address of the bound mobile device, and store the same into the device storage area, and set the binding state as bind, and execute Step 108.

Step 108, perform data interactive operation between the smart key device and the current paired mobile device.

More details about the data interactive operation between the smart key device and the current paired mobile device will be given in Embodiment 4, which will not be described in this embodiment.

Embodiment 2

Figure 2:
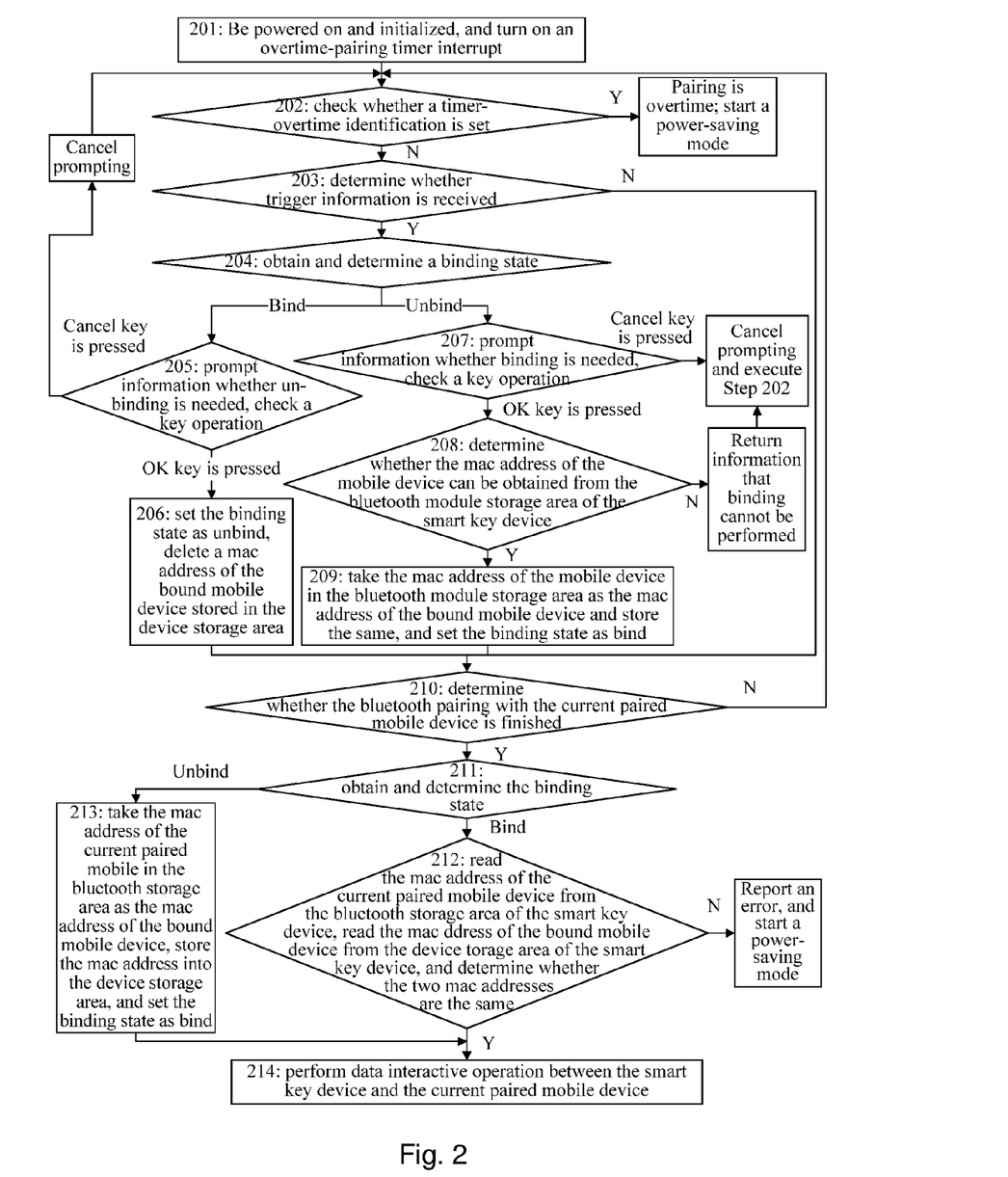
FIG. 2 illustrates a flow chart of a method for realizing bluetooth-binding between a smart key device and a mobile device according to Embodiment 2 of the present invention.

Embodiment 2 of the present invention provides a method for realizing bluetooth-binding between a smart key device and a mobile device, and this embodiment applies to a smart key device with functions of bluetooth communication, display screen and key, and, as shown in FIG. 2, the smart key device executes following steps:

Step 201, be powered on and initialized, and turn on an overtime-pairing timer interrupt.

In this embodiment, the method further includes: start an overtime-pairing timer, trigger the overtime-pairing timer interrupt when the value of the overtime-pairing timer reaches a preset duration, and then set a timer-overtime identification, and exit from the overtime-pairing timer interrupt; preferably, the preset duration is 2 min.

Initialization includes: an IO pin is set as a low level, where it is agreed in advance that the low level identifies that the bluetooth is not paired, and a high level identifies that the bluetooth is paired.

Step 202, check whether a timer-overtime identification is set; if yes, the paring is overtime, and start a power-saving mode; otherwise, execute Step 203.

Step 203, determine whether trigger information is received; if yes, execute Step 204; otherwise, execute Step 210.

In this embodiment, determining whether the trigger information is received specifically includes:

the first manner determining whether an OK key is long pressed, if yes, performing operation of binding or unbinding, otherwise, executing Step 210.

Preferably, in this manner, that the OK key being pressed for at least 3 second is thought as the OK key being long pressed.

the second manner determining whether an instruction trigger sent by an upper computer is received, if yes, performing the operation of binding or unbinding, otherwise, executing Step 210.

Step 204, obtain and determine a binding state; execute Step 205 in case that the binding state is bind; execute Step 207 in case that the binding state is unbind.

Specifically, a device bluetooth-bind identification is read from a device storage area of the smart key device, and whether the device bluetooth-bind identification is set is determined; if yes, the binding state is bind, and Step 205 is executed; otherwise, the binding state is unbind, and Step 207 is executed.

In this embodiment, it is agreed in advance that when the device bluetooth-bind identification is set, it is indicated that the smart key device has been bound to the mobile device, and the trigger information is configured to unbind the mobile device; and, when the device bluetooth-bind identification is reset, it is indicated that the smart key device has not been bound to the mobile device, and the trigger information is configured to bind the mobile device.

Step 205, prompt information whether unbinding is needed, check a key operation; cancel the prompting and return to Step 202 in case that a Cancel key is pressed; execute Step 206 in case that the OK key is pressed;

In this embodiment, the smart key device waits for a user to press the Cancel key or the OK key after the smart key device displays the information whether unbinding is needed.

Step 206, set the binding state as unbind, and delete the mac address of the bound mobile device stored in the device storage area, and execute Step 210.

Setting the binding state as unbind specifically includes: resetting the device bluetooth-bind identification stored in the device storage area of the smart key device.

Step 207, prompt information whether binding is needed, check the key operation; cancel the prompting information and return to Step 202 in case that the Cancel key is pressed; execute Step 208 in case that the OK key is pressed.

In this embodiment, the smart key device waits for a user to press the Cancel key or the OK key after the smart key device displays the information whether binding is needed.

Step 208, determine whether the mac address of the mobile device can be obtained from the bluetooth module storage area of the smart key device; if yes, execute Step 209; otherwise, return information that binding cannot be performed, and return to Step 202.

Step 209, take the mac address of the mobile device in the bluetooth module storage area as the mac address of the bound mobile device and save it, and set the binding state as bind, and execute Step 210.

Setting the binding state as bind specifically includes: setting the bluetooth-binding identification stored in the device storage area of the smart key device.

Step 210, determine whether a bluetooth pairing with the current paired mobile device is finished; if yes, execute Step 211; otherwise, return to Step 202.

In this embodiment, when it is detected by the bluetooth smart key device that the IO pin is the high level, the bluetooth pairing is successful.

The process of bluetooth pairing is the same as the process in Step 103, which will not be described herein;

Step 211, obtain and determine the binding state; execute Step 212 in case that the binding state is bind; execute Step 213 in case that the binding state is unbind.

Specifically, the device bluetooth-bind identification is obtained from the device storage area of the smart key device, and whether the device bluetooth-bind identification is set is determined; if yes, execute Step 212; otherwise, execute Step 213.

In this embodiment, in case that the device bluetooth-bind identification is reset, data interactive operation can be performed with any bluetooth mobile device after the bluetooth paring is successful; in case that the device bluetooth-bind identification is set, data interactive operation can be performed only with the one mobile device corresponding to the mac address of the mobile device which is stored in the bluetooth module storage area.

Step 212, read the mac address of the current paired mobile device from the bluetooth module storage area of the smart key device, and read the mac address of the bound mobile device from the device storage area of the smart key device, and determine whether the mac addresses are the same, if yes, execute Step 214, otherwise, report an error, and start the power-saving mode.

The mac address of the current paired mobile device read from the bluetooth module storage area of the smart key device is the mac address sent by the mobile device to the smart key device.

Step 213, take the mac address of the current paired mobile device in the bluetooth module storage area as the mac address of the bound mobile device and stores the mac address into the device storage area, and set the binding state as bind, and execute Step 214.

Step 214, perform data interactive operation between the smart key device and the current paired mobile device.

More details about the data interactive operation between the smart key device and the current paired mobile device will be given in Embodiment 4, which will not be described in this embodiment.

Embodiment 3

Figure 3:
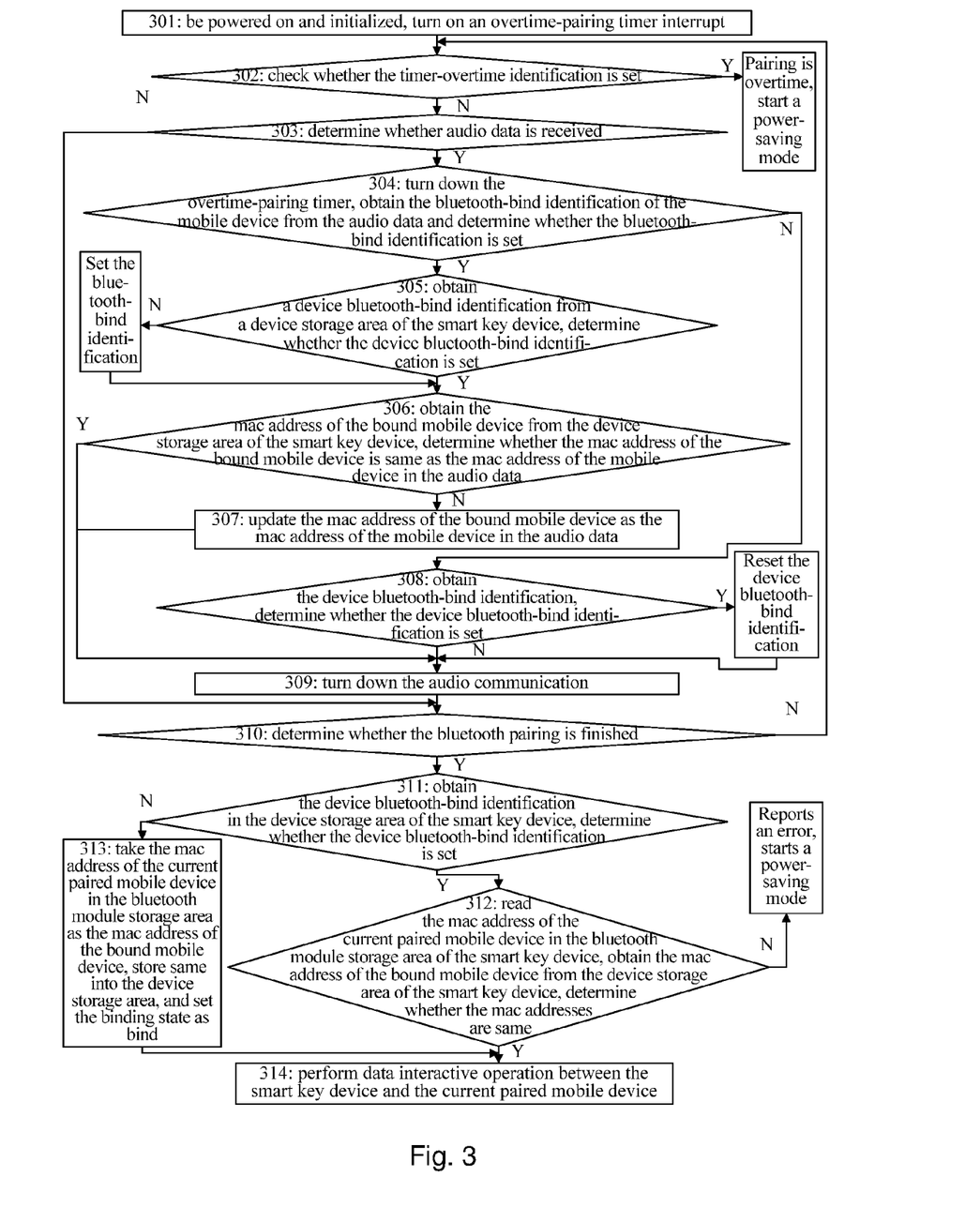
FIG. 3 illustrates a flow chart of a method for realizing bluetooth-binding between a smart key device and a mobile device according to Embodiment 3 of the present invention.

Embodiment 3 of the present invention provides a method for realizing bluetooth-binding between a smart key device and a mobile device, this embodiment applies to a smart key device with a bluetooth function and an audio communication function, and, as shown in FIG. 3, the smart key device executes following steps:

Step 301, be powered on and initialized, and turn on an overtime-pairing timer interrupt.

This embodiment further includes: start an overtime-pairing timer, and trigger the overtime-pairing timer interrupt when the value of the overtime-pairing timer reaches a preset duration, and then set a timer-overtime identification, and exit from the overtime-pairing timer interrupt; preferably, the preset duration is 2 min;

In this embodiment, initialization includes: initialization of audio communication and initialization of bluetooth communication.

The initialization includes: an IO pin is set as a low level, where it is agreed in advance that the low level identifies the bluetooth is not paired and a high level identifies the bluetooth is paired.

Specifically, the smart key device starts to work when the connection with a mobile device is detected by the smart key device.

Step 302, check whether the timer-overtime identification is set; if yes, the paring is overtime, start the power-saving mode; otherwise, execute Step 303.

Step 303, determine whether audio data is received; if yes, execute Step 304; otherwise, execute Step 310.

Figure 4:
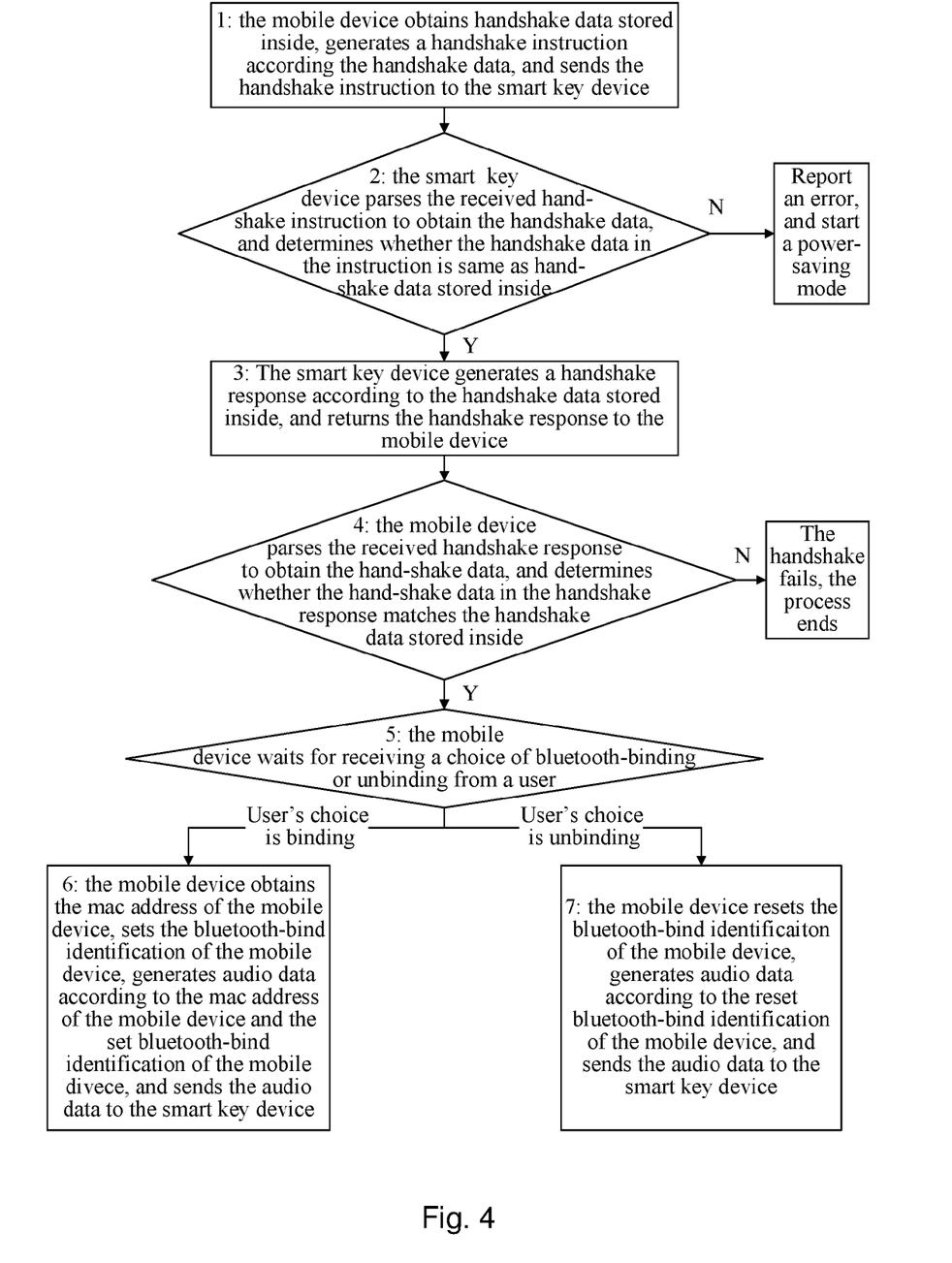
FIG. 4 illustrates a flow chart of data transmission between a mobile device and a smart key device before Step 303 in Embodiment 3 of the present invention.

As shown in FIG. 4, before Step 303, the embodiment further includes:

Step 1, the mobile device obtains handshake data stored inside the mobile device, generates a handshake instruction according to the handshake data, and sends the handshake instruction to the smart key device.

Step 2, the smart key device parses the received handshake instruction to obtain the handshake data, and determines whether the handshake data in the instruction is the same as handshake data stored inside the smart key device; if yes, execute Step 3; otherwise, report an error and start the power-saving mode.

Step 3, the smart key device generates a handshake response according to the handshake data stored inside the smart key device, and returns the handshake response to the mobile device.

Step 4, the mobile device parses the received handshake response to obtain the handshake data, and determines whether the handshake data in the handshake response matches the handshake data stored inside the mobile device, if yes, Step 5 is executed; otherwise, the handshake is failed, and the process comes to an end.

Step 5, the mobile device waits for receiving a choice of bluetooth binding or unbinding from a user, executes Step 6 in case that the user's choice is binding, and executes Step 7 in case that the user's choice is unbinding.

Step 6, the mobile device obtains the mac address of the mobile device, and sets the bluetooth-bind identification of the mobile device, and then generates audio data according to the mac address of the mobile device and the set bluetooth-bind identification of the mobile device, and sends the audio data to the smart key device.

Step 7, the mobile device resets the bluetooth-bind identification of the mobile device, generates audio data according to the reset bluetooth-bind identification of the mobile device, and sends the audio data to the smart key device.

Step 304, turn down the overtime-pairing timer, obtain the bluetooth-bind identification of the mobile device from the audio data, and determine whether the bluetooth-bind identification of the mobile device is set; if yes, execute Step 305; otherwise, execute Step 308.

Step 305, obtain a device bluetooth-bind identification from a device storage area of the smart key device, and determines whether the device bluetooth-bind identification is set; if yes, execute Step 306; otherwise, set the device bluetooth-bind identification, and execute Step 306.

Step 306, obtain the mac address of the bound mobile device from the device storage area of the smart key device, and determine whether the mac address of the bound mobile device is the same as the mac address of the mobile device in the audio data; if yes, execute Step 309; otherwise, execute Step 307.

Step 307, update the mac address cc of the bound mobile device as the mac address of the mobile device in the audio data, and execute Step 309.

Step 308, obtain the device bluetooth-bind identification from the device storage area of the smart key device, and determine whether the device bluetooth-bind identification is set; if yes, reset the device bluetooth-bind identification, and execute Step 309; otherwise, execute Step 309.

Step 309, turn down the audio communication.

Step 310, determine whether the bluetooth pairing is finished; if yes, execute Step 311; otherwise, return to Step 302.

In the embodiment, the bluetooth of the smart key device is paired successfully when the IO pin at the high level is detected by the smart key device.

Step 311, obtain the device bluetooth-bind identification from the device storage area of the smart key device, and determine whether the device bluetooth-bind identification is set; if yes, execute Step 312; otherwise, execute Step 313.

Step 312, read the mac address of the current paired mobile device stored in the bluetooth module storage area of the smart key device, and obtain the mac address of the bound mobile device from the device storage area of the smart key device, and determine whether the mac address of the bound mobile device is same as the mac address of the current matched mobile device, if yes, execute Step 314; otherwise, report an error and start the power-saving mode.

Step 313, take the mac address of the current paired mobile device in the bluetooth module storage area as the mac address of the bound mobile device, and store the mac address into the device storage area, and set the binding state as bind, and then execute Step 314.

Step 314, perform data interactive operation between the smart key device and the current paired mobile device.

In the embodiment, the data interactive operation between the smart key device and the current paired mobile device includes processing a trade instruction sent by the mobile device, such as a signature instruction.

More details about the data interactive operation will be given in Embodiment 4, which will not be described in this embodiment.

Embodiment 4

Figure 5:
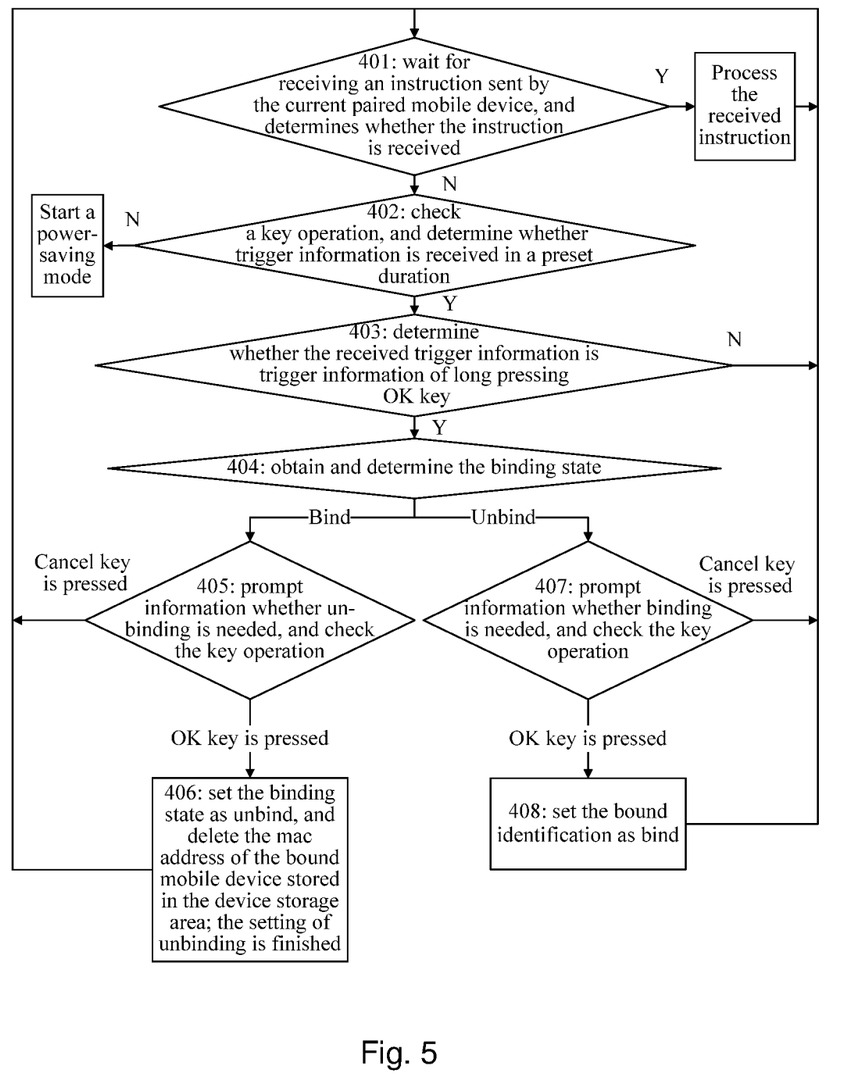
FIG. 5 illustrates a flow chart of a method for realizing data interactive operation between a mobile device and a smart key device according to Embodiment 4 of the present invention.

Embodiment 4 of the present invention provides a method of interaction between a mobile device and a smart key device, and, as shown in FIG. 5, the smart key device executes following operations:

Step 401, wait for receiving an instruction sent by a current paired mobile device, and determine whether any instruction is received; if yes, process the received instruction, and execute Step 401 after the processing is finished; otherwise, execute Step 402.

Processing the received instruction includes processing a trade instruction sent by the mobile device, such as a signature instruction.

For instance, the smart key device signs data which is to be signed in the signature instruction when receiving the signature instruction sent by the current paired mobile device, returns a signature result to the current paired mobile device, and executes Step 401.

In this embodiment, the smart key device determines whether any instruction data is received by a bluetooth serial port by checking FIFO control register. Preferably, if the third digit of the FIFO control register of eight digits is set, the instruction data is received by the bluetooth serial port; if the third digit of the FIFO control register of eight digits is not set, no instruction data is received by the bluetooth serial port.

Step 402, check a key operation, and determine whether trigger information is received in a preset duration; if yes, execute Step 403; otherwise, start a power-saving mode.

Determining whether trigger information is received specifically includes: determining whether a key is pressed down; if yes, execute 403; otherwise, the smart key device turns off.

Step 403, determine whether the trigger information received is trigger information of long pressing an OK key; if yes, execute Step 404; otherwise, return to Step 401.

In this embodiment, the smart key device checks whether IO corresponding to the OK key changes; if yes, the trigger information of long pressing the OK key is received; otherwise, the trigger information of long pressing the OK key is not received.

Preferably, the smart key device sets the IO of the OK key as a high level when being powered on, and the JO of the OK key is changed to a low level when the OK key is pressed.

The smart key device starts a timer interrupt when the JO corresponding to the OK key changes, and sets a timer flag, and when the smart key device detects that the timer flag is set and the IO corresponding to the OK key is still at the low level, it means that the OK key is long pressed.

Step 404, obtain and determine a binding state; execute Step 405 in case that the binding state is bind; execute Step 407 in case that the binding state is unbind.

Specifically, the device bluetooth-bind identification is obtained from the device storage area of the smart key device, and whether the device bluetooth-bind identification is set is determined; if yes, Step 405 is executed; otherwise, Step 407 is executed.

Step 405, prompt information whether unbinding is needed, check the key operation; return to Step 401 in case that a Cancel key is pressed; execute Step 406 in case that the OK key is pressed.

In this embodiment, the smart key device waits for the user to choose the Cancel key or the OK key after displaying the information whether unbinding is needed.

Step 406, set the binding state as unbind, and delete the mac address of the bound mobile device which is stored in the device storage area, the setting of unbinding is finished, and return to Step 401.

Setting the binding state as unbind specifically includes: resetting the device bluetooth-bind identification in the device storage area of the smart key device.

Step 407, prompt information whether binding is needed, check the key operation; return to Step 401 in case that the Cancel key is pressed; execute Step 408 in case that the OK key is pressed.

In this embodiment, the smart key device waits for the user to choose the Cancel key or the OK key after displaying the information whether binding is needed.

Step 408, set the binding identification as bind, and return to Step 401.

Setting the binding state as bind specifically includes: setting the device bluetooth-bind identification in the device storage area of the smart key device.

It can be understood by persons of ordinary skill in the art that all of or part of the steps in the above embodiments can be realized by a program instructing relevant hardware, and the program can be stored in a computer readable storage media, and the steps in the above embodiments are executed when the program is executed; while the storage media includes: each media which can store program codes, such as ROM, RAM, a magnetic disk or an optical disc.

Finally, it should be noted that the foregoing embodiments are merely intended for describing technical solutions of the present invention rather than limiting the present invention. Although the present invention has been described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present invention.

What is claimed is:

1. A method for realizing bluetooth-binding between a smart key device and a mobile device, comprising:
   Step S1, powering on the smart key device and initializing the smart key device;
   Step S2, performing, by the smart key device, bluetooth pairing with a current paired mobile device, and determining whether the pairing is finished in a preset duration, if yes, executing Step S3, otherwise, starting a power-saving mode;
   Step S3, obtaining and determining, by the smart key device, a binding state of the smart key device; executing Step S4 in case that the binding state is bind; executing Step S6 in case that the binding state is unbind;
   Step S4, obtaining, by the smart key device, a mac address of the current paired mobile device from a bluetooth module storage area of the smart key device, and obtaining a mac address of a bound mobile device from a device storage area of the smart key device;
   Step S5, determining, by the smart key device, whether the mac address of the bound mobile device is the same as the mac address of the current paired mobile device, if yes, executing Step S7, otherwise, reporting an error and starting the power-saving mode;
   Step S6, taking, by the smart key device, the mac address of the current paired mobile device in the bluetooth module storage area as the mac address of the bound mobile device, and storing the mac address into the device storage area, and setting the binding state as bind, and executing Step S7;
   Step S7, performing, by the smart key device, a data interactive operation between the smart key device and the current paired mobile device.

2. The method as claimed in claim 1, wherein Step S2 specifically comprises:
   Step S2-1, turning on, by the smart key device, an overtime-pairing timer interrupt;
   Step S2-2, checking, by the smart key device, whether a timer-overtime identification is set, if yes, starting the power-saving mode, otherwise, executing Step S2-3;
   Step S2-3, determining, by the smart key device, whether the bluetooth pairing is finished, if yes, executing Step S3, otherwise, starting the power-saving mode;
   the method further comprises: starting, by the smart key device, an overtime-pairing timer, triggering the overtime-pairing timer interrupt when a value of the overtime-pairing timer reaches a preset duration, setting the timer-overtime identification, and exiting from the overtime-pairing timer interrupt.

3. The method as claimed in claim 1, wherein Step S3 specifically comprises: obtaining, by the smart key device, a device bluetooth-bind identification from the device storage area of the smart key device, and determining whether the device bluetooth-bind identification is set, if yes, the binding state being bind, and executing Step S4, otherwise, the binding state being unbind, and executing Step S6; and
   in Step S6, the setting the binding state as bind specifically comprises: setting the device bluetooth-bind identification.

4. The method as claimed in claim 1, wherein before Step S4, the method further comprises: determining whether the mac address of the current paired mobile device can be obtained from the bluetooth module storage area, and determining whether the mac address of the bound mobile device can be obtained from the device storage area, if yes, executing Step S4, otherwise, reporting an error and starting the power-saving mode; and
   before Step S6, the method further comprises: determining whether the mac address of the current paired mobile device can be obtained from the bluetooth module storage area, if yes, executing Step S6, otherwise, reporting an error, and starting the power-saving mode.

5. The method as claimed in claim 1, wherein, in Step S2, the smart key device performing the bluetooth pairing with the current paired mobile device specifically comprises:
   Step 1, waiting, by the smart key device, for receiving a bluetooth-pairing request sent by the current paired mobile device;
   Step 2, obtaining, by the smart key device, a mac address of the smart key device stored in the bluetooth module storage area after receiving the bluetooth-pairing request, and sending the mac address of the smart key device to the current paired mobile device;
   Step 3, storing, by the current paired mobile device, the mac address of the smart key device, and sending the mac address of the current paired mobile device to the smart key device;

Step 4, storing, by the smart key device, the mac address of the current paired mobile device into the bluetooth module storage area, and the paring being finished.

6. The method as claimed in claim 5, wherein
   Step 3 specifically comprises: storing, by the current paired mobile device, the mac address of the smart key device, receiving a pairing password entered by a user, and sending a verifying-pairing-password instruction which includes the pairing password and the mac address of the current paired mobile device to the smart key device;
   between Step 3 and Step 4, the method further comprises: obtaining, by the smart key device, the pairing password from the pairing-password instruction after receiving the verifying-paired-password instruction, and determining whether the pairing password matches a pairing password stored inside the device, if yes, executing Step 4, otherwise, reporting an error, and ending.

7. The method as claimed in claim 1, wherein between Step S1 and Step S2, the method further comprises:
   Step a1, determining, by the smart key device, whether key-triggered information is received, if yes, executing Step a2, otherwise, executing Step S2;
   Step a2, determining, by the smart key device, the binding state; executing Step a3 in case that the binding state is bind; executing Step a4 in case that the binding state is unbind;
   Step a3, deleting the mac address of the bound mobile device stored in the device storage area, and setting the binding state as unbind, and executing Step S2;
   Step a4, obtaining the mac address of the current paired mobile device from the bluetooth module storage area, taking the mac address as the mac address of the bound mobile device, and storing the address into the device storage area, and setting the current binding state as bind, and executing Step S2.

8. The method as claimed in claim 7, wherein
   before Step a3, the method further comprises: prompting, by the smart key device, information whether unbinding is needed, and checking a key operation; executing Step a3 in case that an OK key is pressed; canceling prompting information of unbinding and executing Step S2 in case that a Cancel key is pressed.

9. The method as claimed in claim 7, wherein, before Step a4, the method further comprises: prompting, by the smart key device, information whether binding is needed, and checking a key operation; executing Step a4 in case that the OK key is pressed; canceling prompting information of binding and executing Step S2 in case that a Cancel key is pressed.

10. The method as claimed in claim 7, wherein, before Step a4, the method further comprises: determining, by the smart key device, whether the mac address of the current paired mobile device can be obtained from the bluetooth module storage area, if yes, executing Step a4, otherwise, returning information that binding cannot be performed, and executing Step S2.

11. The method as claimed in claim 1, wherein between Step S1 and Step S2, the method further comprises:
   Step b1, determining, by the smart key device, whether audio data is received, if yes, executing Step b2, otherwise, executing Step S2;
   Step b2, determining, by the smart key device, a type of operation according to the audio data; executing Step b3 in case that the operation is binding; executing Step b4 in case that the operation is unbinding;
   Step b3, taking, by the smart key device, a mac address of a mobile device in the audio data as the mac address of the bound mobile device and storing the address into the device storage area, and setting the binding state as bind, and executing Step S2;
   Step b4, deleting, by the smart key device, the mac address of the bound mobile device in the device storage area, and setting the binding state as unbind, and executing Step S2.

12. The method as claimed in claim 11, wherein Step S1 further comprises: initializing audio communication; and
   before executing Step S2, the method further comprises: turning down, by the smart key device, the audio communication, and executing Step S2.

13. The method as claimed in claim 11, wherein, before Step b3, the method further comprises:
   Step c1, obtaining the binding state from the device storage area, and determining whether the binding state is bind, if yes, executing Step c2, otherwise, executing Step b3;
   Step c2, obtaining the mac address of the bound mobile device from the device storage area, determining whether the mac address of the mobile device in the audio data is the same as the mac address of the bound mobile device in the device storage area, if yes, executing Step b5, otherwise, executing Step b3.

14. The method as claimed in claim 11, wherein, before Step b4, the method further comprises:
   Step d1, obtaining the binding state from the device storage area, and determining whether the binding state is bind, if yes, executing Step b4; otherwise, executing Step d2;
   Step d2, obtaining the mac address of the bound mobile device from the device storage area, and determining whether the mac address of the mobile device in the audio data is the same as the mac address of the bound mobile device in the device storage area, if yes, executing Step b5, otherwise, executing Step b4.

15. The method as claimed in claim 11, wherein, before Step b1, the method further comprises:
   Step e1, waiting, by the mobile device, for receiving a choice from a user; executing Step e2 in case that the choice from the user is bluetooth binding; executing Step e3 in case that the choice from the user is unbinding;
   Step e2, obtaining, by the mobile device, the mac address of the mobile device, generating, according to the mac address of the mobile device, audio data indicating that binding is needed, and sending the audio data to the smart key device, and executing Step b1;
   Step e3, generating, by the mobile device, the audio data indicating that unbinding is needed, and sending the audio data to the smart key device, and executing Step b1.

16. The method as claimed in claim 15, wherein, in Step e2, the generating, according to the mac address of the mobile device, the audio data indicating that binding is needed, specifically comprises: setting, by the mobile device, the bluetooth-bind identification of the mobile device, and generating the audio data according to the mac address of the mobile device and the set bluetooth-bind identification of the mobile device;
   in Step e3, the generating the audio data indicating unbinding is needed specifically comprises:

resetting, by the mobile device, the bluetooth-bind identification of the mobile device, and generating the audio data according to the reset bluetooth-bind identification of the mobile device;

in Step b2, the determining the type of the operation according to the audio data specifically comprises: obtaining the bluetooth-bind identification of the mobile device from the audio data, and determining the bluetooth-bind identification of the mobile device; in case that the bluetooth-bind identification is set, a binding operation being indicated, executing Step b3; in case that the bluetooth-bind identification is reset, an unbinding operation is indicated, executing Step b5.

17. The method as claimed in claim 15, wherein, before Step e1, the method further comprises:

Step f1, obtaining, by the mobile device, handshake data stored inside the device, generating a handshake instruction according to the handshake data, and sending the handshake instruction to the smart key device;

Step f2, parsing, by the smart key device, the received handshake instruction to obtain the handshake data, determining whether the handshake data in the handshake instruction matches handshake data stored inside the device, if yes, executing Step f3, otherwise, executing Step S2;

Step f3, generating, by the smart key device, a handshake response according to the handshake data stored inside the device, and returning the handshake response to the mobile device;

Step f4, parsing, by the mobile device, the received handshake response to obtain the handshake data, determining whether the handshake data in the handshake response matches the handshake data stored inside the device, if yes, executing Step e1, otherwise, executing Step S2.

18. The method as claimed in claim 1, wherein Step S7 specifically comprises:

Step g1, waiting, by the smart key device, for receiving an instruction sent by the current paired mobile device, and determining whether the instruction is received, if yes, processing the received instruction, and returning to Step g1 after the processing is finished, otherwise, executing Step g2;

Step g2, checking, by the smart key device, a key operation, and determining whether a key trigger is received in a preset duration, if yes, executing Step g3, otherwise, starting the power-saving mode;

Step g3, determining, by the smart key device, whether received trigger information is trigger information of long pressing the OK key, if yes, executing Step g4, otherwise, returning to Step g1;

Step g4, obtaining, by the smart key device, the binding state from the device storage area and checking the binding state; executing Step g5 in case that the binding state is bind; executing Step g6 in case that the binding state is unbind;

Step g5, setting, by the smart key device, the binding state as unbind, deleting the mac address of the bound mobile device stored in the device storage area, and returning to Step g1;

Step g6, setting, by the smart key device, the binding state as bind, storing the mac address of the current paired mobile device into the device storage area, and returning to Step g1.

19. The method as claimed in claim 18, wherein, before Step g5, the method further comprises: prompting, by the smart key device, information whether unbinding is needed, and checking the key operation; executing Step g5 in case that the OK key is pressed; canceling prompting information of unbinding and returning to Step g1 in case that a Cancel key is pressed.

20. The method as claimed in claim 18, wherein, before Step g6, the method further comprises: prompting, by the smart key device, information whether binding is needed, and checking the key operation; executing Step g6 in case that the OK key is pressed; canceling prompting information of binding and executing Step g1 in case that a Cancel key is pressed.

* * * * *